United States Patent
Alpert

(10) Patent No.: US 9,679,219 B2
(45) Date of Patent: Jun. 13, 2017

(54) IMAGE FEATURE CLASSIFICATION

(71) Applicant: International Business Machines Corporation, Armonk, NY (US)

(72) Inventor: Sharon Alpert, Rehovot (IL)

(73) Assignee: International Business Machines Corporation, Armonk, NY (US)

(*) Notice: Subject to any disclaimer, the term of this patent is extended or adjusted under 35 U.S.C. 154(b) by 28 days.

(21) Appl. No.: 14/824,446

(22) Filed: Aug. 12, 2015

(65) Prior Publication Data

US 2017/0046590 A1   Feb. 16, 2017

(51) Int. Cl.
  *G06K 9/46* (2006.01)
  *G06T 11/60* (2006.01)

(52) U.S. Cl.
  CPC ......... *G06K 9/4671* (2013.01); *G06K 9/4642* (2013.01); *G06T 11/60* (2013.01); *G06T 2207/10081* (2013.01); *G06T 2207/30068* (2013.01)

(58) Field of Classification Search
  CPC .. G06K 9/4671; G06K 9/4676; G06K 9/6267; G06K 9/6268; G06K 9/6277; G06K 2209/05; G06T 2207/20081
  See application file for complete search history.

(56) References Cited

U.S. PATENT DOCUMENTS

| | | | | |
|---|---|---|---|---|
| 7,515,743 | B2 | 4/2009 | Kiraly et al. | 382/131 |
| 8,649,594 | B1 | 2/2014 | Hua et al. | 382/159 |
| 2013/0336547 | A1 | 12/2013 | Komogortsev | G06K 9/0061 |
| 2015/0227809 | A1* | 8/2015 | Alpert et al. | G06K 9/4671 382/132 |

OTHER PUBLICATIONS

Cheng et al., "Global Contrast based Salient Region Detection", pp. 1-8, pdf provided by inventor on May 11, 2015, <http://vecg.cs.ucl.ac.uk/Projects/SmartGeometry/contrast_saliency/paper_docs/contrast_saliency_small_cvpr11.pdf>.

Jiang, et al., "Submodular Salient Region Detection", University of Maryland, College Park, MD, 20742, pp. 1-8, pdf provided by inventor on May 11, 2015, <http://www.umiacs.umd.edu/~zhuolin/Publications/CVPR2013_SubmodularSaliency.pdf>.

Shokoufandeh, et al., "View-based object recognition using saliency maps", Image and Vision Computing 17 (1999) 445-460, received in revised form Mar. 23, 1998; © 1999 Elsevier Science B.V., PII: S0262-8856(98)00124-3.

Vargas, et al., "Image Preprocessing assessment Detecting Low Contrast Regions under non-Homogeneous Light Conditions", © Springer-Verlag Berlin Heidelberg 2011, pp. 1-11.

* cited by examiner

*Primary Examiner* — Andrew W Johns
(74) *Attorney, Agent, or Firm* — Steven F. McDaniel

(57) ABSTRACT

A method, executed by one or more processors, includes computing a saliency surface for an image, conducting a mean shift algorithm on the saliency surface to provide mean shift data for the saliency surface, producing a mode voting map for the saliency surface from the mean shift data, and classifying features in the image according to the mode voting map. The features may correspond to medical conditions. In some embodiments, computing the saliency surface comprises determining a distinctiveness score for each of a plurality of image patches. In some embodiments, producing the mode voting map comprises determining a plurality of modes and an area of influence for each mode of the plurality of modes where the area of influence corresponds to mean shift data that leads to a particular mode. A corresponding computer program product and computer system are also disclosed herein.

20 Claims, 4 Drawing Sheets

Example Saliency Surface
| 1 | 1 | 1 | 1 | 1 | 1 | 1 | 1 | 1 | 1 | 1 |
|---|---|---|---|---|---|---|---|---|---|---|
| 1 | 1 | 1 | 1 | 1 | 1 | 1 | 1 | 1 | 1 | 1 |
| 1 | 1 | 1 | 1 | 2 | 2 | 1 | 1 | 1 | 1 | 1 |
| 1 | 1 | 1 | 2 | 3 | 3 | 2 | 1 | 1 | 1 | 1 |
| 1 | 1 | 2 | 4 | 5 | 5 | 4 | 2 | 1 | 1 | 1 |
| 1 | 2 | 3 | 5 | 5 | 5 | 5 | 3 | 2 | 1 | 1 |
| 1 | 2 | 3 | 5 | 5 | 5 | 5 | 3 | 2 | 1 | 1 |
| 1 | 1 | 2 | 4 | 5 | 5 | 4 | 2 | 1 | 1 | 1 |
| 1 | 1 | 1 | 2 | 3 | 3 | 2 | 1 | 1 | 1 | 1 |
| 1 | 1 | 1 | 1 | 2 | 2 | 1 | 1 | 1 | 1 | 1 |
| 1 | 1 | 1 | 1 | 1 | 1 | 1 | 1 | 1 | 1 | 1 |
| 1 | 1 | 1 | 1 | 1 | 1 | 1 | 1 | 1 | 1 | 1 |
FIG. 3A
Mean Shift in X
| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |
| 0 | 0 | 0 | +.3 | +.4 | +.1 | -.1 | -.4 | -.3 | 0 | 0 |
| 0 | 0 | +.3 | +.6 | +.6 | +.3 | -.3 | -.6 | -.6 | -.3 | 0 |
| 0 | +.3 | +.8 | +.8 | +.6 | +.3 | -.3 | -.6 | -.8 | -.8 | -.3 |
| +.3 | +.6 | +.8 | +.7 | +.4 | +.2 | -.2 | -.4 | -.7 | -.8 | -.6 | -.3 |
| +.3 | +.6 | +.8 | +.7 | +.4 | +.2 | -.2 | -.4 | -.7 | -.8 | -.6 | -.3 |
| 0 | +.3 | +.8 | +.8 | +.6 | +.3 | -.3 | -.6 | -.8 | -.8 | -.3 | 0 |
| 0 | 0 | +.3 | +.6 | +.6 | +.3 | -.3 | -.6 | -.6 | -.3 | 0 | 0 |
| 0 | 0 | 0 | +.3 | +.4 | +.1 | -.1 | -.4 | -.3 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
FIG. 3B
Mean Shift in Y
| 0 | 0 | 0 | 0 | 0 | -.3 | -.3 | 0 | 0 | 0 | 0 |
|---|---|---|---|---|---|---|---|---|---|---|
| 0 | 0 | 0 | 0 | -.3 | -.6 | -.6 | -.3 | 0 | 0 | 0 |
| 0 | 0 | 0 | -.3 | -.8 | -.8 | -.8 | -.8 | -.3 | 0 | 0 |
| 0 | 0 | -.3 | -.6 | -.8 | -.7 | -.7 | -.8 | -.6 | -.3 | 0 |
| 0 | 0 | -.4 | -.6 | -.6 | -.4 | -.4 | -.6 | -.6 | -.4 | 0 |
| 0 | 0 | -.1 | -.3 | -.3 | -.2 | -.2 | -.3 | -.3 | -.1 | 0 |
| 0 | 0 | +.1 | +.3 | +.3 | +.2 | +.2 | +.3 | +.3 | +.1 | 0 |
| 0 | 0 | +.4 | +.6 | +.6 | +.4 | +.4 | +.6 | +.6 | +.4 | 0 |
| 0 | 0 | +.3 | +.6 | +.8 | +.7 | +.7 | +.8 | +.6 | +.3 | 0 |
| 0 | 0 | 0 | +.3 | +.8 | +.8 | +.8 | +.8 | +.3 | 0 | 0 |
| 0 | 0 | 0 | 0 | +.3 | +.6 | +.6 | +.3 | 0 | 0 | 0 |
| 0 | 0 | 0 | 0 | 0 | +.3 | +.3 | 0 | 0 | 0 | 0 |
FIG. 3C
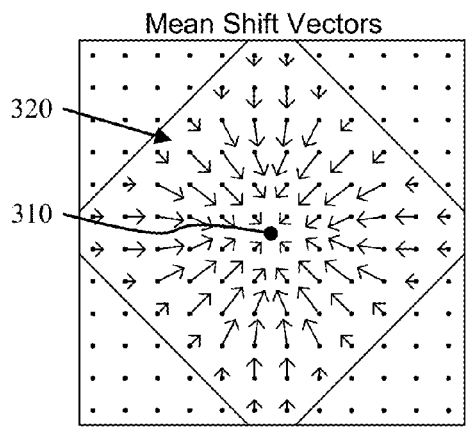
FIG. 3D
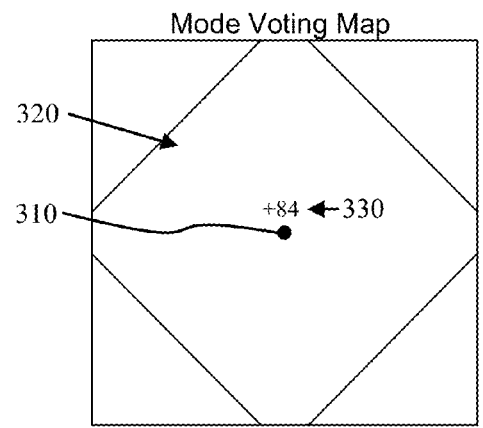
FIG. 3E Example Saliency Surface
| 1 | 1 | 1 | 1 | 1 | 1 | 1 | 1 | 1 | 1 | 1 |
|---|---|---|---|---|---|---|---|---|---|---|
| 1 | 2 | 3 | 2 | 1 | 1 | 1 | 1 | 2 | 2 | 1 |
| 1 | 2 | 3 | 1 | 1 | 2 | 2 | 2 | 3 | 2 | 1 |
| 1 | 2 | 1 | 2 | 3 | 3 | 5 | 2 | 2 | 1 | 1 |
| 1 | 1 | 2 | 5 | 5 | 4 | 3 | 2 | 2 | 1 | 1 |
| 1 | 1 | 3 | 5 | 4 | 4 | 4 | 3 | 3 | 2 | 1 |
| 1 | 1 | 2 | 3 | 4 | 4 | 5 | 5 | 3 | 2 | 1 |
| 1 | 1 | 1 | 2 | 3 | 5 | 6 | 4 | 3 | 2 | 1 |
| 1 | 1 | 2 | 1 | 2 | 3 | 4 | 3 | 2 | 1 | 1 |
| 1 | 2 | 4 | 3 | 2 | 2 | 2 | 1 | 1 | 2 | 2 | 1 |
| 1 | 1 | 2 | 2 | 2 | 1 | 1 | 1 | 2 | 3 | 2 | 1 |
| 1 | 1 | 1 | 1 | 1 | 1 | 1 | 1 | 1 | 1 | 1 |
FIG. 4A
Mean Shift in X
| 0 | 0 | 0 | 0 | 0 | 0 | 0 | 0 | 0 | 0 | 0 |
|---|---|---|---|---|---|---|---|---|---|---|
| +.6 | +.4 | 0 | -.4 | -.6 | -.3 | +.3 | -.4 | +.1 | -.1 | -.4 | -.3 |
| +.6 | +.3 | -.1 | -.2 | -.1 | +.4 | +.4 | 0 | -.2 | -.4 | -.6 | -.3 |
| +.2 | +.3 | +.4 | +.4 | +.6 | +.1 | -.2 | -.5 | -.8 | -.4 | -.3 | 0 |
| +.3 | +.9 | +.9 | +.5 | 0 | -.4 | -.5 | -.6 | -.6 | -.4 | -.3 | 0 |
| +.6 | +.9 | +.7 | +.4 | 0 | -.2 | -.2 | -.3 | -.5 | -.6 | -.6 | -.3 |
| +.3 | +.6 | +.7 | +.6 | +.4 | +.2 | 0 | -.3 | -.7 | -.8 | -.6 | -.3 |
| 0 | +.3 | +.6 | +.8 | +.8 | +.4 | 0 | -.5 | -.8 | -.7 | -.6 | -.3 |
| +.3 | +.2 | +.3 | +.4 | +.5 | +.5 | 0 | -.5 | -.7 | -.6 | -.3 | 0 |
| +.8 | +.6 | +.3 | -.2 | -.4 | -.4 | -.4 | -.1 | +.1 | +.1 | -.1 | -.4 |
| +.3 | +.4 | +.4 | 0 | -.4 | -.4 | 0 | +.6 | +.4 | 0 | -.4 | -.6 |
| 0 | 0 | 0 | 0 | 0 | 0 | 0 | 0 | 0 | 0 | 0 |
FIG. 4B
Mean Shift in Y
| 0 | -.4 | -.7 | -.2 | 0 | -.3 | -.3 | -.3 | -.6 | -.4 | 0 | 0 |
|---|---|---|---|---|---|---|---|---|---|---|---|
| 0 | -.4 | -.2 | -.3 | -.6 | -.6 | -.9 | -.4 | -.4 | -.1 | 0 | 0 |
| 0 | 0 | 0 | -.7 | -.9 | -.7 | -.7 | -.4 | -.2 | +.1 | 0 | 0 |
| 0 | +.4 | 0 | -.7 | -.7 | -.6 | -.5 | -.4 | 0 | +.1 | 0 | 0 |
| 0 | +.4 | 0 | -.4 | -.4 | -.3 | -.3 | -.5 | 0 | -.1 | 0 | 0 |
| 0 | +.3 | 0 | +.1 | 0 | -.2 | -.2 | -.4 | -.2 | -.4 | 0 | 0 |
| 0 | 0 | +.2 | +.7 | +.4 | 0 | -.2 | -.2 | 0 | 0 | 0 | 0 |
| 0 | -.3 | -.2 | +.4 | +.4 | +.3 | +.2 | +.4 | +.4 | +.1 | -.3 | 0 |
| 0 | -.2 | -.3 | 0 | +.4 | +.6 | +.7 | +.8 | +.4 | -.2 | -.4 | 0 |
| 0 | 0 | 0 | +.1 | +.4 | +.8 | +.9 | +.8 | +.4 | 0 | -.1 | 0 |
| 0 | +.2 | +.5 | +.3 | +.4 | +.6 | +.8 | +.6 | +.3 | +.1 | -.1 | 0 |
| 0 | +.3 | +.8 | +.6 | +.4 | +.3 | -.3 | 0 | +.2 | +.5 | -.4 | 0 |
FIG. 4C
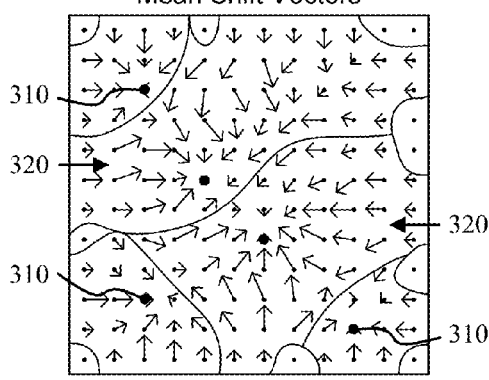
FIG. 4D
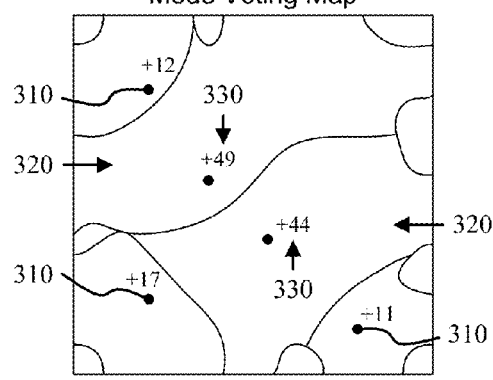
FIG. 4E

US 9,679,219 B2

IMAGE FEATURE CLASSIFICATION

BACKGROUND OF THE INVENTION

The present invention relates generally to image processing and specifically to classifying objects and features in images such as medical images.

Detection of salient image regions in natural images has been at the focal point of research in recent years. An appealing property of saliency algorithms is that they capture informative portions of an image without learning any information on a particular scene. Thus saliency algorithms are highly versatile and beneficial for a wide range of applications. For example, as disclosed in paragraph [0008] and elsewhere of U.S. patent application Ser. No. 14/178,313, which is incorporated herein by reference, saliency maps may be produced for medical images and used to identify salient regions within the medical images. Subsequently, medical condition classifiers may be applied to the salient regions within the medical images to determine if each of the medical images correspond to a normal or abnormal medical condition.

SUMMARY

As disclosed herein a method, executed by one or more processors, includes computing a saliency surface for an image, conducting a mean shift algorithm on the saliency surface to provide mean shift data for the saliency surface, producing a mode voting map for the saliency surface from the mean shift data, and classifying features in the image according to the mode voting map. The features may correspond to medical conditions. In some embodiments, computing the saliency surface comprises determining a distinctiveness score for each of a plurality of image patches. In some embodiments, producing the mode voting map comprises determining a plurality of modes and an area of influence for each mode of the plurality of modes where the area of influence corresponds to mean shift data that leads to a particular mode. A corresponding computer program product and computer system are also disclosed herein.

BRIEF DESCRIPTION OF THE DRAWINGS

FIGS. 3A-3C are data tables, FIG. 3D is a vector plot, and FIG. 3E is a voting map that depicts idealized example saliency data processed according to one embodiment of the method of FIG. 2;

FIGS. 4A-4C are data tables, FIG. 4D is a vector plot, and FIG. 4E is a voting map that depicts non-idealized example saliency data processed according to one embodiment of the method of FIG. 2.

DETAILED DESCRIPTION

The embodiments disclosed herein enable the classification of image features for a wide variety of image data.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

The present invention will now be described in detail with reference to the Figures.

Figure 1:
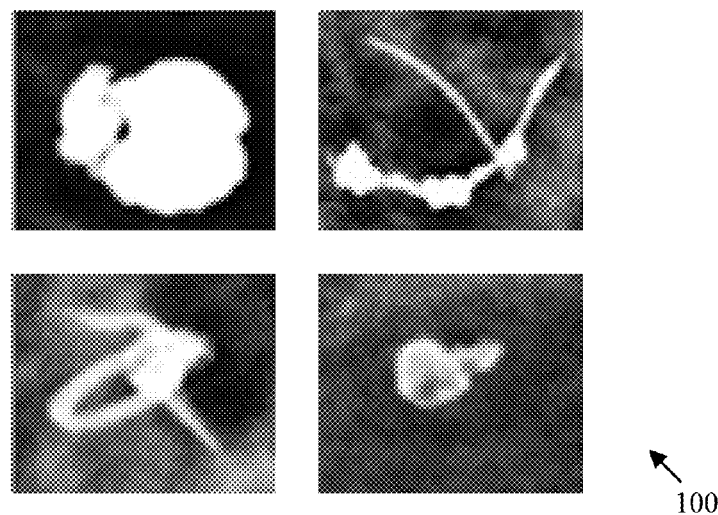
FIG. 1 depicts one example of a set of medical images in accordance with at least one embodiment of the present invention.

FIG. 1 depicts one example of a set of medical images 100 in accordance with at least one embodiment of the present invention. Each of the medical images 100 show macrocalcifications that were captured within mammograms. Although breast calcifications are usually benign and non-cancerous, certain patterns of calcifications—such as tight clusters with irregular shapes—may indicate breast cancer. The medical images 100 demonstrate the variation in size, shape and contrast that may be associated with specific features such as calcifications. The embodiments disclosed herein where developed in response to such variations.

Figure 2:
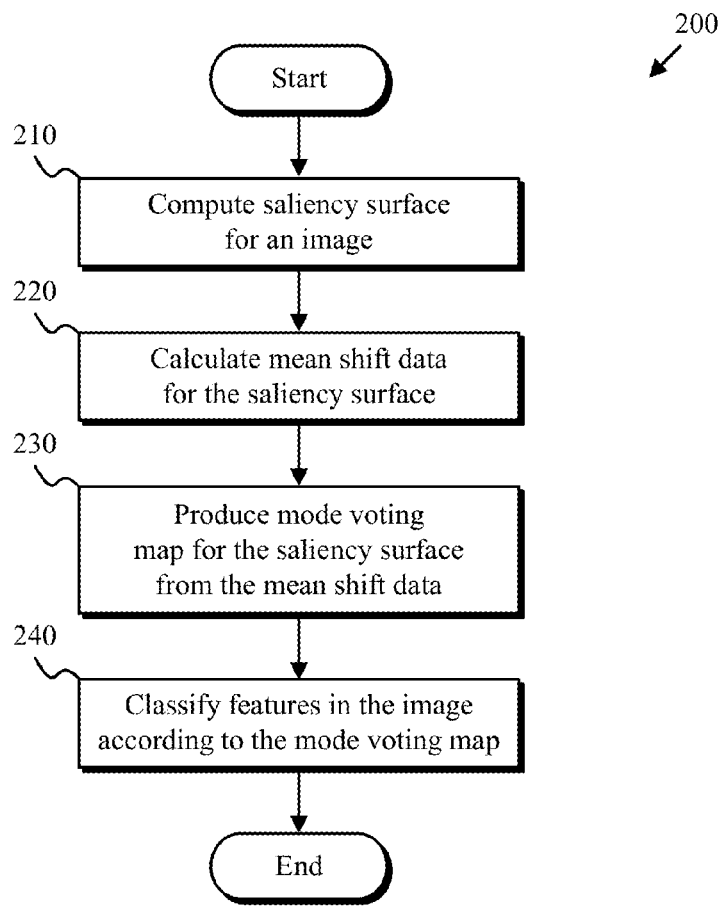
FIG. 2 is a flowchart depicting one example of a feature classification method in accordance with at least one embodiment of the present invention.

FIG. 2 is a flowchart depicting one example of a feature classification method 200 in accordance with at least one embodiment of the present invention. As depicted, the feature classification method 200 includes computing (210) a saliency surface for an image, calculating (220) mean shift data for the saliency surface, producing (230) a mode voting map for the saliency surface, and classifying (240) features in the image. The feature classification method 200 may be conducted on images such as medical images for which feature identification and classification is desired.

Computing (210) a saliency surface for an image may include dividing the image into patches and/or regions and computing a saliency score for each patch or region in the image. In some embodiments, the saliency score is computed according to one of the methods disclosed in U.S. patent application Ser. No. 14/178,313 which is incorporated herein by reference. For example, U.S. patent application Ser. No. 14/178,313 discloses "computing a patch distinctiveness score for each of multiple patches of a medical image; computing a shape distinctiveness score for each of multiple regions of the medical image; and computing a saliency map [i.e., surface] of the medical image, by combining the patch distinctiveness score and the shape distinctiveness score." U.S. patent application Ser. No. 14/178,313 further discloses: "In some embodiments, the computing of the patch distinctiveness score comprises: applying principal component analysis (PCA) to the multiple patches, to represent each of the multiple patches by a set of expansion coefficients; and summing the set of expansion coefficients, to produce the patch distinctiveness score for each of the multiple patches."

U.S. patent application Ser. No. 14/178,313 further discloses: "In some embodiments, the computing of the shape distinctiveness score comprises: applying an edge detection algorithm to each of the multiple regions, to detect at least one pair of boundary edges in each of at least some of the multiple regions; for each pair of boundary edges (p, q): computing a length (lpq) of a vector $(\overline{pq})$ and an orientation ($\Psi$pq) of the vector $(\overline{pq})$, computing a normal ($\theta_p$) to the boundary edge (p) and a normal ($\theta_q$) to the boundary edge (q), and computing histograms for lpq, $\Psi$pq, $\theta_p$ and $\theta_q$; and computing the shape distinctiveness score for each of the at least some of the multiple regions, based on an entropy computation of the histograms." In addition to the methods disclosed in U.S. patent application Ser. No. 14/178,313, computing (210) a saliency surface for an image may include conducting other saliency computation methods known to those of skill in the art.

Calculating (220) mean shift data for the saliency surface may include computing at regular intervals over the saliency surface a difference between a weighted center of each interval and the center point of each interval. The weighted center of each interval may be determined by weighting the position of each data point within the interval with the height of the saliency surface at each data point. The intervals may be overlapping and the resulting mean shift data may be a set of "shift" vectors that indicate the trend toward a mode (i.e., a local maxima) of the saliency surface. In one embodiment, the weighted center along a dimension x, Wc(x), is computed by dividing a sum of the product of the locations (e.g., $x_i$) and the saliency values at those locations $S(x_i)$ by the sum of saliency values $S(x_i)$ namely, $Wc(x)=\Sigma x_i S(x_i)/\Sigma S(x_i)$. Therefore, in the described embodiment, the mean shift along x would conform to the equation:

$$MS(x)=[\Sigma x_i S(x_i)/\Sigma S(x_i)]-x \quad (1)$$

and the mean shift along y would conform to the equation:

$$MS(y)=[\Sigma y_i S(y_i)/\Sigma S(y_i)]-y \quad (2)$$

and a mean shift vector MS (x,y) would be:

$$MS(x,y)=MS(x)\cdot\hat{x}+MS(y)\cdot\hat{y} \quad (3)$$

where $\hat{x}$ and $\hat{y}$ are unit vectors along x and y respectively. In some embodiments, the saliency terms within the summation (i.e., $S(x_i)$ and $S(y_i)$) are weighted by a kernel function in order give greater weight to the saliency values near the center of the interval.

In some embodiments, the saliency surface S(x,y) is normalized to the range (0 . . . 1] and saliency values S(x,y) that are near zero may be set to a minimum value in order to reduce numerical instability. In certain embodiments, the weight of the kernel function at point (x,y) is given by |1./log(1−S(x,y))|. However, for the purpose of simplicity the embodiments depicted within the Figures use a kernel function that is constant over each interval and can therefore be omitted. See FIGS. 3B-3D and FIGS. 4B-4D for two specific examples of computing mean shift data for the example saliency data shown in FIGS. 3A and 4A, respectively.

Producing (230) a mode voting map for the saliency surface may include determining the mode that each point in the saliency surface is associated with. For example, at each point in the saliency surface the mean shift (vector) data may be followed until a mode is encountered. Subsequently, the saliency surface may be partitioned into regions, referred to herein as mode regions or areas of influence, where each region corresponds to a particular mode. In some embodiments, a weight or "vote count" for each mode is computed by determining the area of (e.g., number of discrete points within) each region. See FIGS. 3E and 4E for two specific examples of a mode voting map corresponding to the example saliency data shown in FIGS. 3A and 4A, respectively.

Classifying (240) features in the image may include running a classifier on the mode voting map rather than the image itself. In some embodiments, filters, such as difference of Gaussians (DOG) filters, may be further applied to the mode voting maps to achieve feature enhancement. Examples of classifiers include nearest neighbor, generative classifiers, logistic regression, support vector machine (SVM), random forest, and deep belief network classifiers.

To enable the execution of operation 240, one or more classifiers may be trained on a training set of mode voting maps derived from a set of training images. For example, a classifier may be a medical condition classifier that is trained on mode voting maps produced from medical images for which a portion of the medical images are known to correspond to the medical condition. The classifier may then be used to execute operation 240 and classify mode voting maps derived from medical images for which a diagnosis of the medical condition is desired.

FIGS. 3A-3C are data tables, FIG. 3D is a vector plot, and FIG. 3E is a voting map that depicts idealized example saliency data processed according to one embodiment of the method of FIG. 2. FIG. 3A depicts one example of an idealized saliency surface. FIG. 3B depicts one example of mean shift data for the saliency surface of FIG. 3A along an 'X' (i.e., horizontal) dimension. FIG. 3C depicts one example of mean shift data for the saliency surface of FIG. 3A along an 'Y' (i.e., vertical) dimension. FIG. 3D depicts the mean shift data of FIGS. 3B and 3C in vector form. FIG. 3E is a mode voting map that corresponds to FIGS. 3A-3D.

Saliency data such as the idealized saliency surface shown in FIG. 3A may generated from a source image (not shown). As previously mentioned, the saliency data may capture informative portions of the image without learning any information on the particular scene. Mean shift data such as that shown in FIGS. 3B-3D (and described with respect to the calculating operation 220) may be calculated from the saliency data and used to identify one or more modes 310 and mode regions 320 comprising data points that share (i.e., whose mean shift vectors lead to) a common mode 310. As shown in FIGS. 3D and 3E, the idealized example data depicted in FIG. 3A results in a single mode 310 and mode region 320 where the mode region 320 contains 84 data points resulting in a mode vote count (330) of +84.

The position of the mode 310 may be selected to be the position of the highest magnitude saliency value (i.e., the maximum value) within the corresponding mode region 320. If multiple saliency data points within a mode region share the maximum value, the position of the mode may be a selected position such as the position of the first or last encountered saliency data point that has a value equal to the maximum value. Alternately, an average position of the saliency data points that are equal to the maximum value may be selected, or the position of the maximum value saliency data point that has the shortest mean shift vector may be selected. In the idealized example depicted in FIGS. 3D and 3E, the selected position of the mode 310 is the position of the maximum value saliency data point within the mode region 320 that has the shortest mean shift vector.

FIGS. 4A-4C are data tables, FIG. 4D is a vector plot, and FIG. 4E is a voting map that depicts non-idealized example saliency data processed according to one embodiment the method of FIG. 2. FIG. 4A depicts one example of a non-idealized saliency surface. FIG. 4B depicts one example of mean shift data for the saliency surface of FIG. 4A along an 'X' (i.e., horizontal) dimension. FIG. 4C depicts one example of mean shift data for the saliency surface of FIG. 4A along an 'Y' (i.e., vertical) dimension. FIG. 4D depicts the mean shift data of FIGS. 4B and 4C in vector form. FIG. 4E is a mode voting map that corresponds to FIGS. 4A-4D.

As depicted, the non-idealized saliency data of FIG. 4A may not be as well-formed or symmetric as the idealized saliency data of FIG. 3A. However, each saliency data point can be associated with (e.g., one of eight) neighboring data points via the mean shift vectors shown in FIG. 4D. Saliency data points with a low mean shift value (i.e., with short mean shift vectors) may be paired with themselves. The list of neighboring data points can then be partitioned into groups (i.e., regions) and the vote count 330 (or strength) of the mode can be computed by counting the number of data points in each group. Mode groups/regions with a low maximum saliency value may be dropped. The result of such a procedure is depicted with the mode voting map shown in FIG. 4C that includes five modes 310 and five mode regions 320. Classification may then be conducted on the mode voting map (using whatever representational format is desirable) instead of the original image.

One of skill in the art will appreciate the computational simplicity and the potential compactness of the mode voting map relative to the saliency data and original image data. For example, the resolution of the saliency data and the mode voting map may be reduced relative to the resolution of the image data. Furthermore, many saliency data points may be represented as a single mode in the mode voting map. In addition, low saliency regions (corresponding to unimportant regions in the original image) may be automatically omitted from further processing including classification. For example, in the depicted example 144 saliency data points are represented with 5 mode positions 310 and mode counts 330. The described reduction in data may increase the speed and accuracy of conducting classifications.

Figure 5:
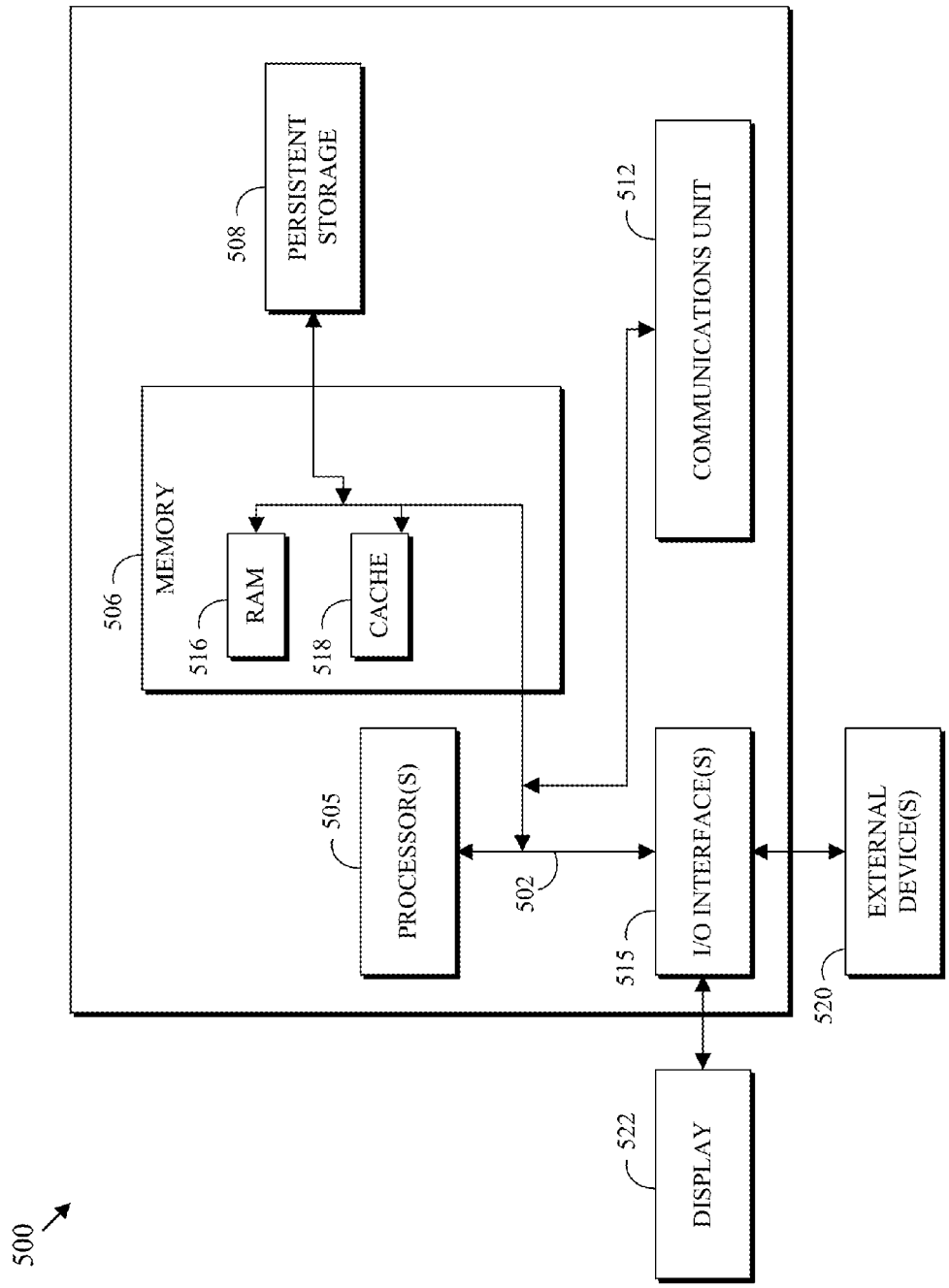
FIG. 5 is a block diagram depicting one example of a computing apparatus (i.e., computer) suitable for executing the methods disclosed herein.

FIG. 5 is a block diagram depicting components of a computer 500 suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:
   computing a saliency surface for an image;

conducting a mean shift algorithm on the saliency surface to provide mean shift data for the saliency surface;

producing a mode voting map for the saliency surface from the mean shift data; and classifying features in the image according to the mode voting map.

2. The method of claim 1, wherein producing the mode voting map comprises determining a plurality of modes and an area of influence for each mode of the plurality of modes.

3. The method of claim 2, wherein the area of influence corresponds to mean shift data that leads to a particular mode.

4. The method of claim 1, wherein computing the saliency surface comprises determining a distinctiveness score for each of a plurality of image patches.

5. The method of claim 1, wherein computing the saliency surface comprises applying principal component analysis (PCA) to a plurality of image patches.

6. The method of claim 1, wherein the features correspond to one or more medical conditions.

7. The method of claim 1, further comprising producing a plurality of mode voting maps for a plurality of medical images comprising images of normal and abnormal medical conditions and training a classifier on the plurality of mode voting maps to produce a medical condition classifier.

8. A computer program product comprising:

one or more computer readable storage media and program instructions stored on the one or more computer readable storage media, wherein each computer readable storage medium of the one or more computer readable storage media is not a transitory signal per se, the program instructions comprising instructions to:

compute a saliency surface for an image;

conduct a mean shift algorithm on the saliency surface to provide mean shift data for the saliency surface;

produce a mode voting map for the saliency surface from the mean shift data; and classify features in the image according to the mode voting map.

9. The computer program product of claim 8, wherein the instructions to produce the mode voting map comprises instructions to determine a plurality of modes and an area of influence for each mode of the plurality of modes.

10. The computer program product of claim 9, wherein the area of influence corresponds to mean shift data that leads to a particular mode.

11. The computer program product of claim 8, wherein the instructions to compute the saliency surface comprise instructions to determine a distinctiveness score for each of a plurality of image patches.

12. The computer program product of claim 8, wherein the instructions to compute the saliency surface comprise instructions to apply principal component analysis (PCA) to a plurality of image patches.

13. The computer program product of claim 8, wherein the features correspond to one or more medical conditions.

14. The computer program product of claim 8, wherein the program instructions comprise instructions to produce a plurality of mode voting maps for a plurality of medical images comprising images of normal and abnormal medical conditions and training a classifier on the plurality of mode voting maps to produce a medical condition classifier.

15. A computer system comprising:

one or more computers;

one or more computer readable storage media and program instructions stored on the one or more computer readable storage media for execution by at least one of the computers, the program instructions comprising instructions to:

compute a saliency surface for an image;

conduct a mean shift algorithm on the saliency surface to provide mean shift data for the saliency surface;

produce a mode voting map for the saliency surface from the mean shift data; and classify features in the image according to the mode voting map.

16. The computer system of claim 15, wherein the instructions to produce the mode voting map comprises instructions to determine a plurality of modes and an area of influence for each mode of the plurality of modes.

17. The computer system of claim 16, wherein the area of influence corresponds to mean shift data that leads to a particular mode.

18. The computer system of claim 15, wherein the instructions to compute the saliency surface comprise instructions to determine a distinctiveness score for each of a plurality of image patches.

19. The computer system of claim 15, wherein the features correspond to one or more medical conditions.

20. The computer system of claim 15, wherein the program instructions comprise instructions to produce a plurality of mode voting maps for a plurality of medical images comprising images of normal and abnormal medical conditions and training a classifier on the plurality of mode voting maps to produce a medical condition classifier.

* * * * *